US007613667B2

(12) United States Patent
Coen et al.

(10) Patent No.: US 7,613,667 B2
(45) Date of Patent: Nov. 3, 2009

(54) METHODS AND SYSTEMS FOR ANALYZING INCIDENT REPORTS

(75) Inventors: Gary A. Coen, Bellevue, WA (US); Ping Xue, Redmond, WA (US)

(73) Assignee: The Boeing Company, Chicago, IL (US)

( * ) Notice: Subject to any disclaimer, the term of this patent is extended or adjusted under 35 U.S.C. 154(b) by 264 days.

(21) Appl. No.: 11/173,598

(22) Filed: Jun. 30, 2005

(65) Prior Publication Data

US 2007/0005650 A1 Jan. 4, 2007

(51) Int. Cl.
*G06E 1/00* (2006.01)
*G06E 3/00* (2006.01)
(52) U.S. Cl. .............................. 706/21; 705/10; 700/16
(58) Field of Classification Search ................... 706/45; 705/10; 700/16
See application file for complete search history.

(56) References Cited

U.S. PATENT DOCUMENTS

| 5,991,714 | A | 11/1999 | Shaner |
| 6,477,491 | B1 | 11/2002 | Chandler et al. |
| 6,487,531 | B1 | 11/2002 | Tosaya et al. |
| 6,507,829 | B1 | 1/2003 | Richards et al. |
| 6,563,911 | B2 | 5/2003 | Mahoney |
| 6,701,293 | B2 | 3/2004 | Bennett et al. |
| 6,741,963 | B1 | 5/2004 | Badt et al. |
| 6,751,628 | B2 | 6/2004 | Coady |
| 6,757,692 | B1 | 6/2004 | Davis et al. |
| 6,810,146 | B2 | 10/2004 | Loui et al. |
| 6,952,695 | B1 | 10/2005 | Trinks et al. |
| 2003/0126106 | A1 | 7/2003 | Coen |
| 2004/0034795 | A1* | 2/2004 | Anderson et al. ............ 713/201 |
| 2004/0193572 | A1* | 9/2004 | Leary ............................. 707/1 |
| 2006/0282303 | A1* | 12/2006 | Hale et al. .................... 705/10 |

OTHER PUBLICATIONS

Iliano Cervesato, What Event Calculus actually does and how to do it efficiently (1994), Proc of GULP-PRODE Joint Conference on Declarative Programming.*

* cited by examiner

*Primary Examiner*—David R Vincent
*Assistant Examiner*—Kalpana Bharadwaj (57) ABSTRACT

Systems and methods for examining text, such as incident reports, are disclosed. In one embodiment, a method includes specifying a client profile including at least one scenario of interest, the scenario of interest being formulated in an event calculus formalism; analyzing a portion of text for relevant information at least partially described by the scenario of interest; detecting relevant information including detecting a positive match between at least part of information relevant to the scenario of interest and at least part of the portion of text being analyzed; upon detecting such relevant information, extracting the relevant information; representing the extracted relevant information in the event calculus formalism; and performing an inference process on the extracted relevant information represented in the event calculus formalism.

25 Claims, 5 Drawing Sheets

202. (a) A 20-year-old male entered the secure area.
 (b) A 20-year-old male went into the secure area.

204. (a) [DP[D a][NP[AP[A 20-year-old]][N male]]]
 (b) [VP[v enter][DP[Det the][NP[N secure area]]]]

206. [EVENT$^{GO}$([ENTITY], [PATH$^{TO}$ ([PLACE $^{IN}$([ENTITY])])]]

208. [EVENT$^{GO-LOC}$([ENTITY$^{MALE}$ [PROPERTY$^{20-YEAR-OLD}$]],
 [PATH$^{TO-LOC}$([PLACE $^{IN-LOC}$([ENTITY$^{SECUREAREA}$])])])]

210. [VP[V go][PP[P into][NP[DP[Det the]][N secure area]]]]

212. [EVENT$^{GO}$([ENTITY], [PATH])]

214. [PATH$^{TO}$([PLACE $^{IN}$ ([ENTITY])])]

FIG.3

302. INITIATE(e, f, t)=[[e=[EVENT $^{GO-LOC}$([ENTITY $^A$], [PATH$^{TO-LOC}$ ([PLACE$^{IN-LOC}$([ENTITY B])])])]] ∧ f =INTRUSION(A,B)]
      ∧ HOLDSAT(SECUREAREA(B), t)
      ∧ ¬HOLDSAT(SECUREPERSON(A), t)]

304. HAPPENS([EVENT $^{GO-LOC}$([ENTITY $^{MALE}$ [PROPERTY $^{20-YEAR-OLD}$ ]],
    [PATH$^{TO-LOC}$ ([PATH$^{IN-LOC}$([ENTITY$^{SECUREAREA}$ ])])])], t)

METHODS AND SYSTEMS FOR ANALYZING INCIDENT REPORTS

FIELD OF THE INVENTION

This invention relates generally to generic information resources like databases and, more specifically, to the analysis and processing of security, law enforcement, and other incident-based information presented in such resources.

BACKGROUND OF THE INVENTION

In the fields of security, law enforcement, and intelligence, one impediment to knowledge discovery and situation awareness can be the sheer volume of textual data collected from various sources that must be processed. This problem can be especially challenging in the context of incident report analysis, such as the (manual and automated) text processing conducted by security, law enforcement, and intelligence agencies, which typically involves sifting through multiple databases for targeted information requirements, where each database maintains its own unique format.

In general, incident reporting is a document publication process that may be important to situation awareness, and which can be institutionalized in diverse domains. Typically, for each reported incident, the incident reporting process captures the incident's location, type, and other information necessary to evaluate an incident and to initiate an appropriate response, if desired. Depending on the domain of application, a report might also identify incident severity, participants, time, frequency, and manner of occurrence. Other items of relevance, such as charts, maps, and digital images may also be included. Information content is partially determined by standards and conventions that vary across domains and institutions. Moreover, some details may routinely appear in reports as free-form text formulated according to the author's apprehension of data, such as situational context, estimation of potential consequences, and anticipated means of resolution. Often, actionable information encoded in these free-form texts is largely or partially ignored by both human-powered and automated incident report analyses.

Institutionalized incident reporting is impractical without software support. Currently, the marketplace for incident report processing promotes standard data management features, such as easy-to-learn operations, protocol-based interoperability, and support for data collection, index-based searches, reports, and records management. State-of-the-art systems, such as, for example, Motorola's Infotrak Law Records Management System (LRMS), feature interoperability with the Federal Bureau of Investigation's reporting system, through which many law enforcement agencies report crime data. Alongside Motorola, others such as NibrSite, Niche Technology, Indico, and various governmental organizations promote more advanced features such as name-based search, email, photo lineups, computer-aided dispatch, and task management. Still other systems, for instance, are capable of ranking incident reports by relevance criteria gleaned in part from incident report texts. All such systems, however, are deficient in their ability to discover targeted information encoded and correlated in complex and non-linear ways within and across massive numbers of reported incidents.

Many large enterprises use standard authoring and data management software to process incident reports, with analytical services being implemented as key-based searches, attribute-based aggregation, and data sorts portraying relevance ranking. As with commercial software, in-house incident report analysis products typically constitute no more than a selection of incident reports from the available data. These selections may be presented to a human analyst who is left with the time-consuming and error-prone task of discovering how the selections satisfy information requirements at hand.

Human attentional and motivational constraints may also impede efficient discovery of information encoded and correlated in complex and non-linear ways within and across massive numbers of reported incidents, only some of which may expressly identify sequences of events and states of affairs denoting potential threats, the collective action of adversarial groups, or other items of interest. Thus, human involvement in the sorting process may result in an incomplete identification of useful sequences of events and states of affairs denoting potential threats contained within the totality of incident reports reviewed. Moreover, human sorting and collation of the incident reports may also fail to fully identify the collective action of adversarial groups, as well as other items of interest, contained in the incident reports. In addition, since the cost of manual intervention is so high and its result so uncertain, teams of domain specialists are usually required to support these knowledge workers to increase the general likelihood of success of the collective effort. In general, knowledge acquisition in unfamiliar domains can be expensive and time-consuming. Thus, institutions which analyze incident reports using conventional technologies alone may overlook key, actionable information, and may fail to achieve or sustain situation awareness.

SUMMARY

The present invention comprises systems and methods for performing information discovery in support of situation awareness, utilizing semantically-rich information extracted from incident reports from various information resources, each with a unique format. In one embodiment, a method for automatically analyzing a portion of text such as that typically occurring in an incident report, comprises specifying a client profile including at least one scenario of interest, the scenario of interest being formulated in an event calculus formalism; analyzing the portion of text for relevant information at least partially described by the scenario of interest; detecting relevant information including detecting a positive match between at least part of information relevant to the scenario of interest and at least part of the portion of text being analyzed; upon detecting such relevant information, extracting the relevant information; representing the extracted relevant information in the event calculus formalism; and performing an inference process on the extracted relevant information represented in the event calculus formalism.

BRIEF DESCRIPTION OF THE DRAWINGS

Embodiments of the present invention are described in detail below with reference to the following drawings.

DETAILED DESCRIPTION

Many specific details of certain embodiments of the invention are set forth in the following description and in FIGS. 1-5 to provide a thorough understanding of such embodiments. One skilled in the art, however, will understand that the present invention may have additional embodiments, or that the present invention may be practiced without one or more of the details described in the following description.

In general, embodiments of methods and systems in accordance with the present invention may permit better information discovery and semantically rich information extraction from incident reports, even when the incident reports come from various information resources having various formats. For example, software infrastructure created consistent with the present invention can be used to process unstructured information used by numerous organizations, such as intelligence, security, law enforcement, and emergency first responder operations. In one embodiment, a method may identify and represent one or more events and then relate event representations with scenarios that interest a profiled community of users, yielding an analysis of textual input sufficient to identify one or more scenarios embodying client information requirements instantiated in a collection of incident reports. Where event data represented in this way exhaustively instantiate the event formulae encoding client information requirements, embodiments of the present invention may deductively confirm the occurrence of a scenario of interest to affected clients. Where the event data partially instantiate client information requirements, embodiments of the present invention may consult certainty factors attributed to profiles by clients in order to forecast upcoming events consistent with an unfolding scenario of interest. Where deductive confirmation and prediction work in this way, the reverse operation of explaining unexpected events by comparing them to client profiles abductively can provide valuable analytical insight. In this way, the authoring and data management services of prior art technology can be augmented to improve the sorting and collation of numerous incident reports.

More specifically, in one embodiment, a software tool is provided which automates the process of information discovery from incident report texts. Text analysis may be used to (1) integrate processes and representations for the expression of information requirements, (2) detect relevant information in textual data, and (3) perform inferences upon those data. This may be accomplished by having clients subscribe to system services by specifying scenarios of interest expressed as patterns of events. Client profiles, including scenarios of interest and other information, are then used to determine which data may be more (or less) significant to information extraction processes, thereby enabling selective extraction of relevant matters from incident report texts. Extracted information is then represented in event calculus formulae that draw upon a fixed set of semantic objects signifying entities and events that relate to them. In this way, significant information encoded in incident report texts may be exposed to inference processes native to the event calculus.

In the following discussion, the terms "incident report" and "event report" may variously be used to refer to any text of interest. Such texts of interest may include texts found in a database.

Figure 1:
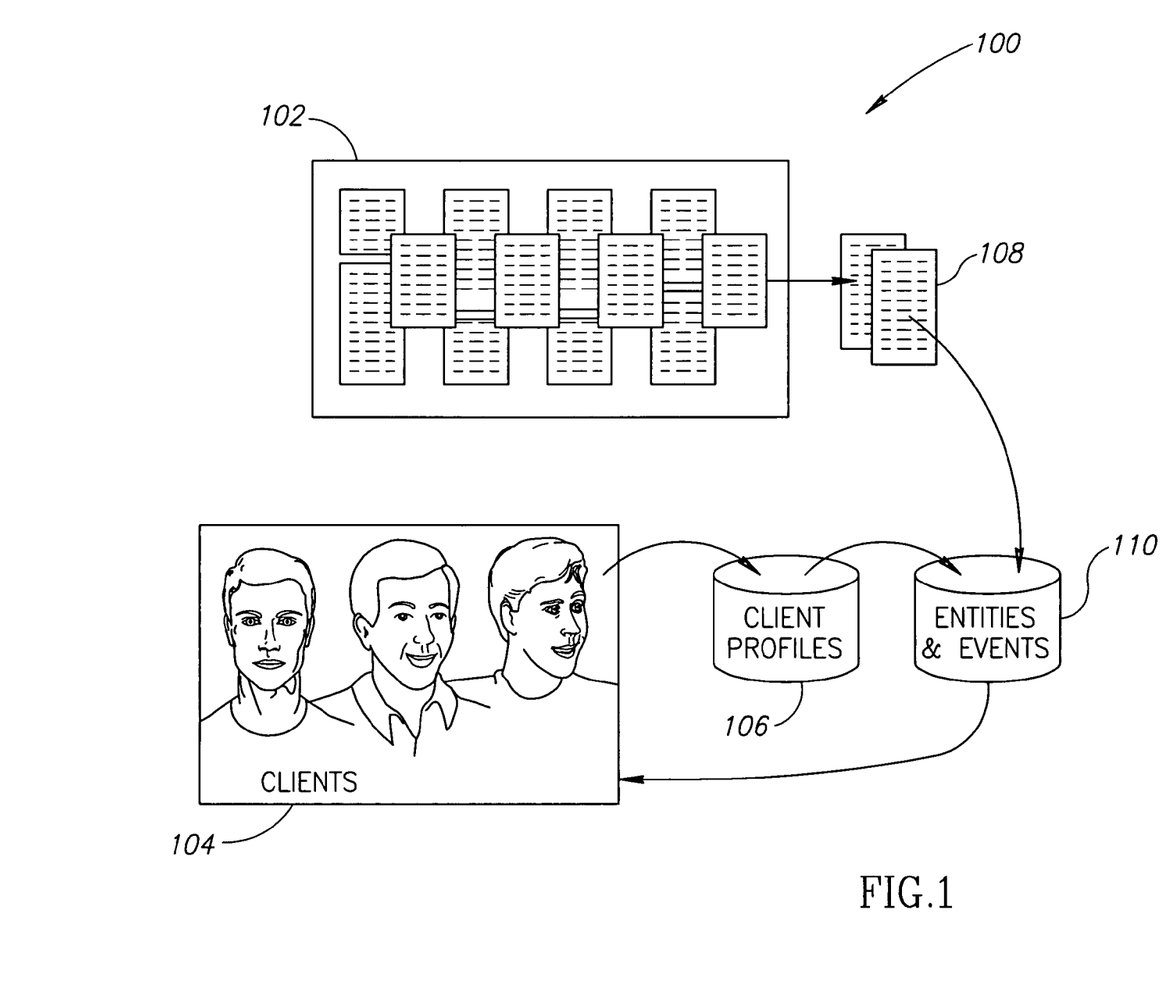
FIG. 1 is a schematic view of an incident report processing system in accordance with one embodiment of the invention.

FIG. 1 is a schematic view of an incident report processing system 100 in accordance with an embodiment of the invention. The system 100 includes at least one text 102 which a human or electronic client 104 has an interest in processing. The texts 102 may include incident reports, or any other texts of interest to a particular client. Clients 104 subscribe to the system 100 by specifying scenarios of interest expressed as patterns of events. These scenarios of interest are used to form client profiles 106, which are then employed to determine which data from the texts 102 are more (or less) significant to information extraction processes, thus enabling selective extraction of relevant matters 108 (i.e. the matters falling within a range having the greatest degree of significance) from the texts 102. The relevant matters 108 extracted from the texts 102 are then represented in event calculus formulae that draw upon a fixed set of semantic objects signifying entities and events 110 which relate the relevant matters 108. In this way, significant information encoded in texts 102 is exposed to inference processes native to the event calculus. This approach may be accomplished through text analysis which, in a particular embodiment, (1) integrates processes and representations for the expression of information requirements, (2) detects relevant information in textual data, and (3) performs inferences upon those data.

Client profiles 106 can specify numerous scenarios, each of which may be tailored to describe a particular threat as well as event sequences and states of affairs that enable the particular threat. In addition, client profiles may contain participants, relationships, or any other thing or event of interest to a particular client. This approach may combine processes and representations so that client profiles 106, text events, and event calculus formulae are treated as multi-dimensional relations involving entities and intervals of time. The system 100 may then alert profiled clients 104 whenever relevant matters 108 extracted from the texts 102 accumulate in sufficient detail to infer a match with targeted items of interest. For example, the system 100 may provide an alert when the accumulation is sufficient to identify sequences of events and states of affairs denoting potential threats, the collective action of adversarial groups, or based on some other item of interest or alert criteria.

In one embodiment, confirmation and prediction of profiled scenarios may be treated as logical deduction, and explanation may be treated as a form of abduction. When analysis of a set of texts 102 denotes events that fully instantiate a particular scenario, one or more appropriately profiled clients 104 may be alerted to confirm that occurrence. Moreover, when the texts 102 denote events that partially instantiate a scenario and logically meet certainty conditions specified by clients during the profiling process, appropriate clients 104 may be notified to be on the lookout for the culminating events of that scenario which have not yet taken place. In addition to such deductive applications, unexpected event sequences may be compared to client profiles 106 abductively (either automatically or on-demand) to attempt to discover explanations for unanticipated occurrences. On analogy with the process of logical abduction, by which the conclusion of a syllogism bears the probability of the minor premise when the major premise is certain, it is similarly possible to identify the most likely profiled scenarios to frame the unexpected events in their sequence of occurrence. In this way, a novel and heretofore unachievable predictive capability may be realized.

Profiled information requirements from the client profiles 106 may guide information extraction in the form of relevant matters 108 from the texts 102 in various ways. For example, in one embodiment, semantically rich information extraction from texts 102 is accomplished with natural language engineering components including finite-state automata using a finite-state calculus. As used herein, the term natural language engineering component generally includes a constituent element of an engineered system which processes natural language input and produces output satisfying the constraints for which the system was designed.

The interests of clients 104 (and, consequently, client profiles 106) are mutable, and the states of profiles 106 partially or wholly determine the content of the relevant matter 108 extracted from the texts 102. Because of this, the extraction of the relevant matter 108 from the texts 102 should desirably be implemented efficiently such that the content of client updates satisfies current information requirements. In such an approach to information extraction, precise semantic representations are important and may even be critical to success.

Figure 2:
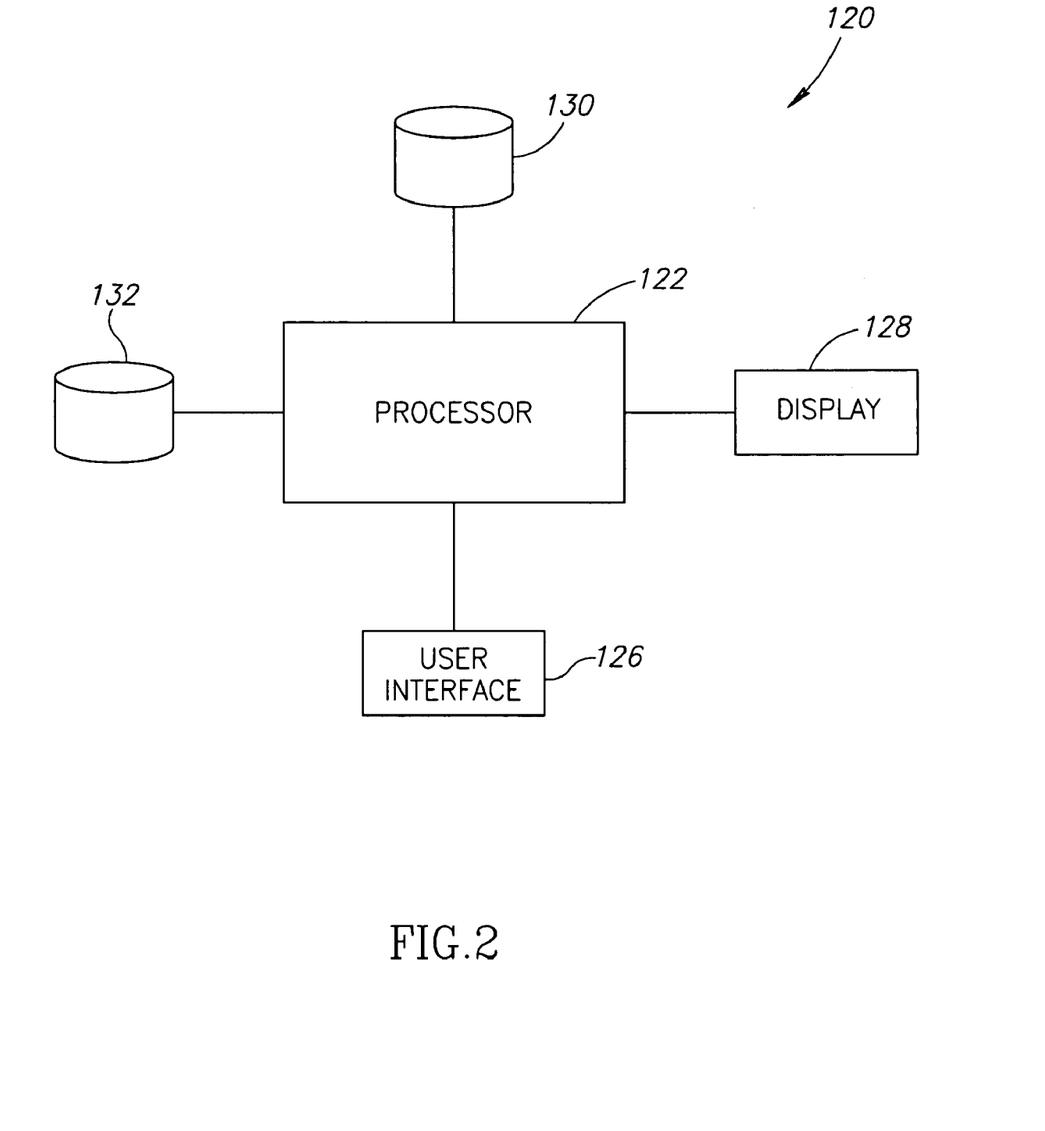
FIG. 2 is a system block diagram of a computer-based database investigation system in accordance with another embodiment of the invention.

FIG. 2 illustrates an example system 120 comprising a general-purpose computer used to execute the functions of an embodiment of the present invention. The system 120 includes a processor 122, a user interface 126, a display 128, a database 130, and a memory device 132. The database 130 may be embodied by some other form of information resource, such as a stream of textual data. It includes any of a number of texts, including, for example, texts maintained by various organizations, such as intelligence, security, law enforcement, and emergency first responder organizations. The memory device 132 includes one or more client profiles. Commands issued to the processor 122 by software, hardware, or via the user interface 126, are executed by the processor 122 enabling it to retrieve reports found in the database 130 and analyze and collate the reports according to client profiles found in the memory device 132. Information extracted from the database 130 and the memory device 132, as well as information collated from either or both devices, may be presented on the display 128 coupled to the processor 122. Whenever the processor 122 determines that events in the information extracted from the database 130 sufficiently instantiate (according to certainty conditions specified by clients during the profiling process) a particular scenario included in a client profile in the memory device 132, the appropriately profiled client may be alerted via the display 126 to confirm that occurrence.

Figure 3:
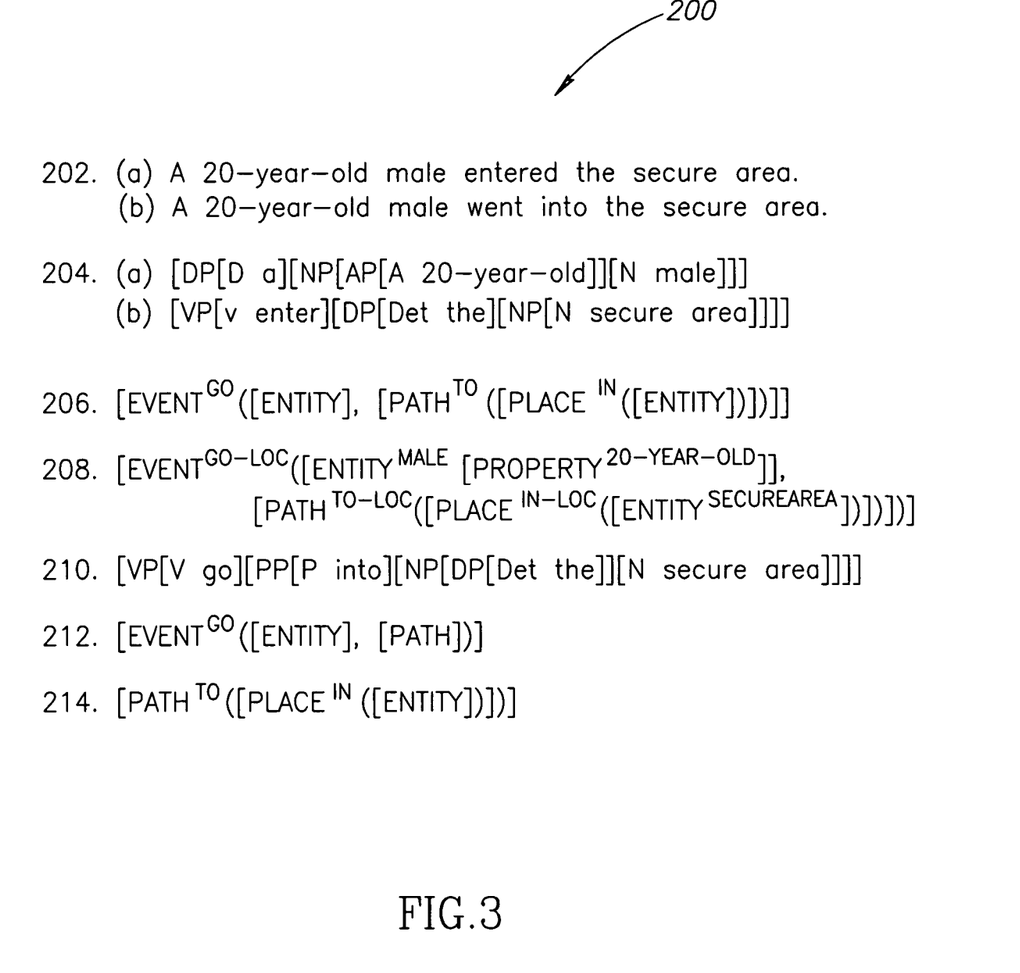
FIG. 3 is a set of event data and semantic representations in accordance with another embodiment of the invention.

FIG. 3 is a set of event data and representations 200 in accordance with another embodiment of the invention. In order to convert an information resource like a database of incident reports (e.g. database 130 of FIG. 2) into a set of event data and representations 200, it is necessary to identify the conceptual content of the individual incident report texts comprising the database. Incident reports may have been taken from, for example, intelligence, security, and law enforcement documents, or any other documents or reports of interest to a specific client or combination of clients. The individual incident report texts often comprise sentences or textual inputs like the textual inputs 202a,b shown in FIG. 3. For example, as shown in the textual input 202a, 'A 20-year-old male entered the secure area', it can be seen that the input 202a has conceptual contents defining the participation of a 20-year-old male entity in a change-of-location event which occurred along a path ending within the interior of another entity that is a secure area. Information expressed at this level of granularity may be sufficient for meaningful inference in support of profiled information requirements. Syntactic representations of noun and verb phrases 204a,b which mediate between input texts 202a,b and representations of conceptual content like 208 are achievable by reducing requirements for syntactic coverage to that which encodes events, their participants, and relevant temporal information. Other matters (e.g. sentence structure) can be ignored without detriment.

Embodiments of the invention may use natural language engineering components for lexical and syntactic descriptions. For example, in one embodiment, a general purpose English lexicon along with an English phrase structure grammar may be used to create a suitable text processing component to support information extraction suitable for automated incident report analysis. In alternate embodiments, different suitable natural language engineering components may be employed that provide lexical and syntactic descriptions like those that mediate between representations of textual inputs 202a,b, syntactic representations 204a,b, and conceptual content 208. Furthermore, suitable natural language engineering components may be created for languages other than English in order to provide information extraction services for use in the automated analysis of incident reports written in foreign languages.

Still referring to FIG. 3, in the analysis of textual inputs 202a,b, lexical descriptions may be exploited to license correspondences between syntactic and semantic representations in the spirit of lexical-conceptual structure theory. Examples of such theories may be found, for example, in "Foundations of Language", by Ray Jackendoff, (New York: Oxford 2002), incorporated by reference.

To effect this exploitation, the textual inputs 202a,b may be automatically analyzed by natural language engineering components. In the example given in FIG. 3, the above-referenced exploitation would analyze input 202a using the composed conceptual functions "go+to+in" from the fragment of a lexical description for the verb "enter" 206, which licenses an intermediate syntactic structure 204b and ultimately yields conceptual content 208 as the semantic analysis of textual input 202a. The difference between the textual inputs 202a,b reflects a contrast between the syntax for the verb phrase in 210 as compared to that in 204b. In one aspect, the invention may use the lexical entry for "enter" to coordinate input like 202a with syntactic representations like 204b and composed conceptual functions like "go+to+in" like 206. The invention may similarly use the lexical entries for "went" (i.e., "go") and "into" to coordinate input like 202b with syntactic representations like 210 and composed conceptual functions 206. In either case, embodiments of the invention may then resolve the verb phrase differences between the textual inputs 202a,b into the identical conceptual content 208.

Stated another way, the differing verb phrases from both textual inputs 202a, 202b may be decomposed into the same word "go". The semantics for the verb in textual input 202b may come from lexical descriptions for "go" in the action representation 212 and "into" in the directional representation 214. It will be noted that "go" may involve a path $[_{PATH}]$ and "into" instantiates the path $[_{PATH}]$. Merger of an action representation 212 and a directional representation 214 is mediated by the syntactic structure 204b, resulting in semantics for the textual input 202a which are identical to those of the textual input 202b. In this way it is possible to exploit lexical descriptions to license correspondences between syntactic and semantic representations in the spirit of lexical-conceptual structure theory resulting in the final conceptual content 208.

By analyzing textual inputs 202a,b in the manner described above, this textual analysis discerns identical and distinct conceptual contents of expressions. Structural variations in language usage like those found in textual inputs 202a,b may proliferate and often confound automated methods intended to recover meaning from such texts. For example, the use of 'entered' in textual input 202a as opposed to "went into" in textual input 202b could be easily overlooked using prior art search and review techniques, despite the fact that the textual inputs 202a,b are equivalent in meaning. Embodiments of the present invention may focus on identifying conceptual content precisely, and may provide a logical form suitable for an event calculus implementation which may be tailored to suit the information requirements of client profiles. In some embodiments, such identification of conceptual content may be achievable because the scope for semantic coverage has been reduced to that mandated by user profile information requirements.

It will be appreciated that in alternate embodiments of the invention, events presented in a stream of incident reports may be treated as sensor data. The process of assimilating the stream of sensor data may then be considered as forms of deduction and abduction. More specifically, given such a stream of textual data, the deductive task may be to signal an alert when an unfolding sequence of events embodies a scenario or trend targeted for identification. When events sufficiently represent the internal structure of a targeted item, the incident analyzer may confirm the occurrence of a profiled event in its sensor data. When events do not sufficiently represent the internal structure of a targeted item, the incident analyzer may predict the occurrence of a profiled event not yet present in the sensor data abductively.

The abductive task may include hypothesizing the relationship between reported events and activities which, given such relevant factors as the incident type, participants, time, location, severity, and other information, may explain the sensor data in terms of its compatibility with a targeted item of interest. For example, if a stream of sensor data is represented as the conjunction F of a set of empirical observations in the form of logical formulae describing events and activities drawn from incident reports, the abduction task is to find an explanation of F in the form of a logical description $\Delta(M)$ of reported events such that $F=\Sigma(B) \hat{0} \Sigma(E) \hat{0} \Delta(N) \hat{0} \Delta(M)$, where "$\hat{0}$" is the logical "AND" operator, and where:

- $\Sigma(B)$ is a background theory comprising axioms for change (including continuous change) in the time and space of events;
- $\Sigma(E)$ is a set of truth conditions relating logical formulae representing events, states, and their participants to one another (i.e., a theory relating logical formulae to extracted information); and
- $\Delta(N)$ is an axiom set comprising logical formulae defining scenarios of interest to a community of users (i.e., a logical description of client information requirements).

According to one embodiment, the event calculus logic of predicates, fluents, and the common-sense law of inertia embodies $\Sigma(B)$; the information extraction component embodies $\Sigma(E)$; and $\Delta(N)$ is the set of user profiles. The information extraction component and the logical inference procedures of the event calculus were described above. More specifically, the logical description $\Delta(M)$ of reported events represents the current logical state of the sensor data stream as a certainty value distributed to each of the scenarios in the set of user profiles. Where the current value from $\Delta(M)$ for some scenario S meets or exceeds trigger conditions defined for S in a client profile, then an alert regarding S may be published to the appropriate client.

Figure 4:
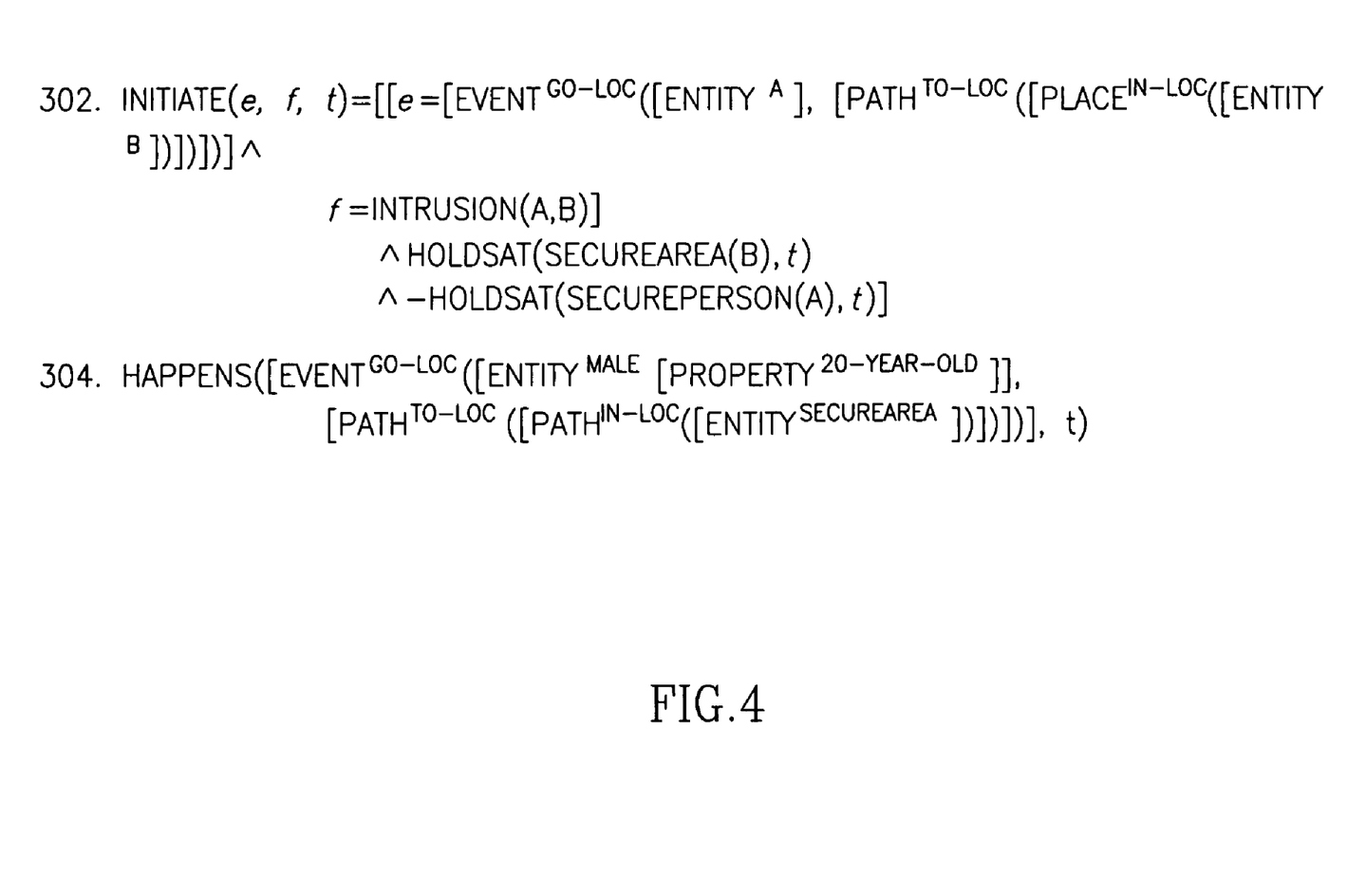
FIG. 4 is an axiom and an event calculus formula in accordance with yet another embodiment of the invention.

FIG. 4 is an axiom 302 and an event calculus formula 304 in accordance with yet another embodiment of the present invention. Representations like the event calculus axiom 302 and formula 304 shown in FIG. 4 represent some bounded domain as a changing configuration of events, states, and entities. Configurations vary across time, and domain-dependent fluents are "true" at certain time points if they have been initiated at some previous time and have not yet terminated. Similarly, a fluent is "false" at some time point if it has not yet been initiated, or if it has been both initiated and terminated.

With continued reference to FIG. 4, within this framework, a narrative of events and states is described via predicate formulas, including, for example, HAPPENS, HOLDSAT, INITIATE, and others. The predicate formula HAPPENS(e, t) signifies that event or state e is true at time t. Similarly, the predicate formula HOLDSAT(f, t) indicates that fluent f is true at time t, and the predicate formula INITIATE(e, f, t) indicates that if event or state e logically obtains at time t, it will initiate fluent f. For example, suppose that a user profile contains the axiom 302 as part of a profiled scenario describing an intrusion upon a security zone. In this example, the formula represented by the axiom 302 could be used to axiomatize an unauthorized entry into a secure area using two predicates (INITIATE and HOLDSAT) and three fluents (INTRUSION, SECUREAREA, and SECUREPERSON). Axiom 302 informs the event calculus to recognize as "true" the fluent INTRUSION(A, B) whenever A is not known to be a secure person, and B is a secure area from time t onward until the fluent is otherwise terminated.

When the axiom 302 is present among the elements of $\Delta(N)$, such as when a text input 202a occurs in an incident report, then analysis of the conceptual content 208 will extract the axiom 302 and place it into an event calculus formula 304. For example, when a text input 202a such as "A 20-year-old male entered the secure area" occurs in an incident report, the presence of the axiom 302 will cause the analysis of its conceptual content 208 to be extracted and placed into an event calculus formula 304, indicating that this event occurred at some time t inferred from the text.

Taken in conjunction with axiom 302, the event calculus formula 304 may figure into a logical sequence supporting the inference that an intrusion was detected at time t. This conclusion may be reached by integrating processes and representations for the expression of information requirements, the detection of relevant information in textual data, and the performance of inferences upon those data.

In one aspect, a report analyzer uses user profiling to create a set of axioms 302 to work in concert with a stream of event calculus formulae 304, thus providing an information-rich network of logical relations for the specific purpose of expressing overt event data extracted from incident reports as well as deductions and abductions that may be derived from them via inferences licensed in user profiles.

Figure 5:
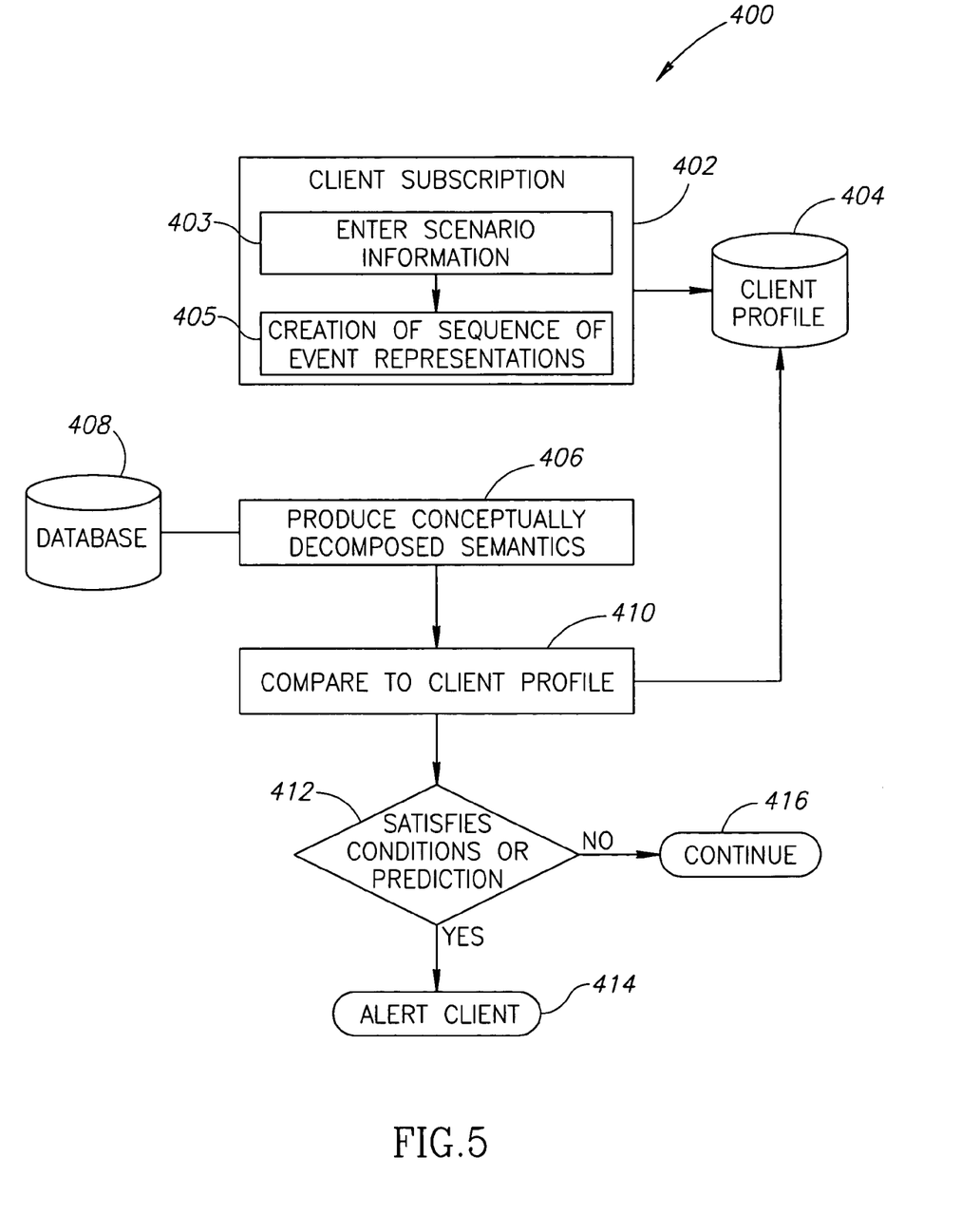
FIG. 5 is a flow chart showing a method of detecting patterns in database files and using the patterns to identify plausible events of interest in accordance with yet another embodiment of the invention.

FIG. 5 is a flow chart showing a method 400 for detecting patterns and participants in incident reports, and using them to identify plausible events of interest in accordance with an embodiment of the invention. The method 400 begins at a block 402 where one or more clients subscribe to a computer-based system adapted for event representation. In general, client subscriber information may include targeted items of interest for particular clients, such as, for example, scenario information 403 in the form of event sequences and participants 405 (individuals or organizations) being investigated. The client subscriber information 402 may be used to create a sequence of event representations which can be input to a specified client profile 404.

At a block 406, files from at least one chosen information repository or database 408 are reviewed, and conceptually decomposed semantics are created. These files, for example, may comprise incident reports from various databases, including, for example, intelligence, security, law enforcement, emergency first responder operations, and other suitable databases. In one embodiment, final conceptual contents of statements in the files are created by natural language engineering components.

At a block 410, the conceptually decomposed data from block 406 is compared to a specified client profile 404. In one embodiment, the comparison is enabled by event formulae automatically generated to express courses of action of interest to the client profile 404. The event formulae may be associated with temporal indices (such as passage of time), and a log of event formulae may be treated as a description of courses of action presented in a sensor data stream. Events may be tracked over time and participants' identities may be resolved across events and temporal sequences. The data streams may be processed with deduction at a block 412 and alerts issued at a block 414 when event sequences embody a profiled scenario including a trend of interest in accordance with client profiles. Textual data streams may also be processed with abduction, where sensor data is explained in terms of comparability with profiled items.

Stated another way, when the decomposed data denote events that sufficiently instantiate a particular scenario as denoted in the client profile 404, appropriately profiled clients may be alerted to confirm that occurrence. Moreover, whenever the decomposed data denote an event that only partially instantiates (but does not sufficiently instantiate) a scenario and logically meets trigger conditions found in the client profile 404, appropriate clients may be notified to be on the lookout for the culminating events of that scenario which have not yet taken place. Block 410 can also compare unexpected event sequences to the client profiles 404 abductively in hopes of discovering explanations for unanticipated occurrences.

If the decomposed data does not fulfill any of these requisites, and it does not meet the trigger conditions set out in the client profile 404, then no alert is issued and the method 400 continues to a block 416 where an opportunity is given to continue reviewing files from a chosen database, a new database, or to end the method 400.

Of course, a variety of alternate embodiments of methods in accordance with the present invention can be conceived, and the invention is not limited to the particular embodiments described above and shown in FIGS. 1-5. For example, it is possible to omit various blocks from FIG. 5. For instance, block 402 need only be performed once, with client profiles being entered before a search of incident reports is instigated. Then, using the client profiles entered, blocks 406-416 may be performed several times in succession on various information resources or databases of interest. Alternately, after one of more databases are examined, block 402 may be revisited in order to allow a subscriber to update a client profile before proceeding to further searches on previously viewed databases or on new databases.

Embodiments of the present invention may be implemented on a variety of platforms that can perform information extraction from a database, including a conventional computer system. In one particular aspect, a machine-readable medium may be used to store a set of machine-readable instructions (e.g. a computer program) onto a computer, wherein the machine-readable instructions embody a method of information extraction in accordance with the present invention. The machine-readable medium may be any type of medium which can store data that is readable by the computer, including, for example, a floppy disk, CD ROM, optical storage disk, magnetic tape, flash memory card, digital video disk, RAM, ROM, or any other suitable storage medium. The machine-readable medium, or the instructions stored thereon, may be temporarily or permanently installed in any desired component of the computer, including, for example, a processor, a memory component, an I/O component, or any other suitable component. Alternately, the machine-readable instructions may be implemented directly into one or more components of the computer, without the assistance of the machine-readable medium.

In operation, the set of software instructions may be stored in the computer (e.g. in a memory component) that causes a portion of a database to be read into the memory component and processed using the processor using a method in accordance with the present invention, including, for example, the method 400 shown in FIG. 5. Alternately, one or more aspects of the various processes described above may be implemented in the computer using any suitable programmable or semi-programmable hardware components (e.g. EPROM components).

Some embodiments of the invention include a software infrastructure for processing unstructured information used in, for example, intelligence, security, law enforcement, emergency first-responder operations, and other suitable types of databases. Embodiments of the invention may complement conventional technology by innovating an efficient means by which to discover information encoded and correlated in complex and non-linear ways within and across massive numbers of reported incidents, only some of which may readily identify sequences of events and states of affairs denoting potential threats, the collective action of adversarial groups, or other items of interest.

Embodiments of the invention advantageously integrate a general theory that identifies and represents events with a more specific theory that relates event formulae with particular scenarios of interest to a profiled community of users. In this way, analyses of textual input can identify one or more of the scenarios instantiated in a collection of incident reports. The reverse operation of explaining a given stream of textual data by hypothesizing the identity of a scenario may also be performed. Thus, analyses of incident reports can be improved.

While preferred and alternate embodiments of the invention have been illustrated and described, many changes can be made without departing from the spirit and scope of the invention. Accordingly, the scope of the invention is not limited by the disclosure of these preferred and alternate embodiments. Instead, the invention should be determined entirely by reference to the claims.

What is claimed is:

1. A method comprising using a computer to automatically process a plurality of documents containing text to extract information of interest to a client, the processing performed by the computer including:

creating a client profile based on at least one scenario of interest to the client, the scenario of interest including a sequence of events, the client profile including an ordering of event representations that are of interest to the client;

conceptually decomposing the text in the documents into decomposed data;

applying event calculus axioms and formula to the client profile and the decomposed data to detect relevant information in the documents; and upon detecting such relevant information, extracting the relevant information from the documents.

2. The method of claim 1, wherein the processing further comprises performing an inference process on the extracted relevant information, including at least one of deductively determining when the extracted relevant information embodies the scenario of interest and abductively determining when the extracted relevant information embodies a scenario of interest.

3. The method of claim 2, wherein deductively determining when the extracted relevant information embodies the scenario of interest includes at least one of confirming the occurrence of the scenario of interest in the extracted relevant information and predicting the occurrence of the scenario of interest in the extracted relevant information.

4. The method of claim 3, wherein predicting the occurrence of the scenario of interest includes determining that the extracted relevant information only partially embodies the scenario of interest, and determining that a confidence weight attached to the partially-embodied scenario of interest is satisfied.

5. The method of claim 1, wherein the processing further comprises performing an inference process on the extracted relevant information, including abductively determining a most likely profiled scenario compatible with a plurality of user-specified events.

6. The method of claim 5, wherein abductively determining a most likely profiled scenario includes performing an inference process based on a logical formula represented as a conjunction F of a set of logical formulae describing events and activities drawn from the portion of text, the conjunction F including the plurality of user-specified events, and finding a logical description $\Delta(M)$ of reported events such that $F=\Sigma(B) \wedge \Sigma(E) \wedge \Delta(N) \wedge \Delta(M)$, where "$\wedge$" is the logical "AND" operator, and where: $\Sigma(B)$ is a background theory comprising axioms for change in space-time, including changes in temporal and spatial locations.

7. The method of claim 1, wherein the processing further comprises performing an inference process on the extracted relevant information, including determining that one or more confidence weights attached to a partially-embodied scenario of interest are satisfied.

8. The method of claim 1, wherein creating a client profile includes specifying at least one of an event and a state of affairs integrated with at least one participant; and wherein the client profile is compared with states, events and participants detected in text.

9. The method of claim 1, wherein creating a client profile includes specifying a confidence weight attached to the scenario of interest, the confidence weight identifying a minimum number of axioms to be instantiated by the extracted relevant information in determining when the extracted relevant information embodies the scenario of interest.

10. The method of claim 1, wherein extracting relevant information includes analyzing the portion of text using a natural language engineering component and providing a linguistic representation of text in the documents.

11. The method of claim 10, wherein the processing further comprises representing the extracted relevant information by arranging the extracted information according to a formal set of truth conditions.

12. The method of claim 10, wherein representing the extracted relevant information includes reducing a unit of information from the portion of text into a syntactic representation of noun and verb phrases, and subsequently reducing the syntactic representation into a semantic representation in the formalism of lexical-conceptual structures.

13. An article comprising computer readable memory encoded with data for causing a computer to automatically process a plurality of documents containing text, the automatic processing including:
  receiving client subscriber information, the subscriber information including at least one scenario of interest to the client, the scenario of interest including at least one of a pattern of events and a participant;
  creating a client profile based on the received subscriber information, the client profile including an ordering of event representations that are of interest to the client;
  conceptually decomposing the text in the documents into decomposed data;
  applying event calculus axioms and formula to the client profile and the decomposed data to detect relevant information in the documents; and
  upon detecting such relevant information, extracting the relevant information from the documents.

14. The article of claim 13, wherein the automatic Processing further includes performing an inference process including at least one of deductively determining when the extracted relevant information embodies a scenario of interest and abductively determining when the extracted relevant information embodies a scenario of interest.

15. The article of claim 14, wherein deductively determining when the extracted relevant information embodies the scenario of interest includes at least one of confirming the occurrence of the scenario of interest in the extracted relevant information and predicting the occurrence of the scenario of interest in the extracted relevant information.

16. The article of claim 15, wherein the predicting the occurrence of the scenario of interest includes determining that the extracted relevant information only partially embodies the scenario of interest, and determining that a confidence weight attached to the partially-embodied scenario of interest is satisfied.

17. The article of claim 13, further comprising performing an inference process includes abductively determining a most likely profiled scenario compatible with a plurality of user-specified events.

18. The article of claim 13, further comprising performing an inference process on the extracted information, including determining that one or more confidence weights attached to a partially-embodied scenario of interest are satisfied.

19. The article of claim 13, wherein extracting the relevant information includes using a natural language engineering component to analyze text in the documents and providing a linguistic representation of at least part of the portion of text.

20. A computer system comprising a computer programmed to automatically process a plurality of documents containing text, the automatic processing including:
  receiving client subscriber information, the subscriber information including at least one scenario of interest to the client, the scenario of interest including at least one of a pattern of events and a participant;
  creating a client profile based on the received subscriber information, the client profile including an ordering of event representations that are of interest to the client;
  conceptually decomposing the text in the documents into decomposed data;
  applying event calculus axioms and formula to the client profile and the decomposed data to detect relevant information in the documents; and
  upon detecting such relevant information, extracting the relevant information from the documents.

21. The computer system of claim 20, wherein the automatic processing further includes at least one of deductively determining when the extracted relevant information embodies the scenario of interest and abductively determining when the extracted relevant information embodies the scenario of interest.

22. The computer system of claim 21, wherein deductively determining when the extracted relevant information embodies the scenario of interest includes at least one of confirming the occurrence of the scenario of interest in the extracted relevant information and predicting the occurrence of the scenario of interest in the extracted relevant information.

23. The computer system of claim 20, wherein the automatic processing further includes abductively determining a most likely profiled scenario compatible with a plurality of user-specified events.

24. The computer system of claim 20, wherein the automatic processing further includes performing an inference process including determining that one or more confidence weights attached to a partially-embodied scenario of interest are satisfied.

25. The computer system of claim 20, wherein extracting the relevant information includes using a natural language engineering component on text in the documents and providing a linguistic representation of at least part of the portion of text.

* * * * *

UNITED STATES PATENT AND TRADEMARK OFFICE
CERTIFICATE OF CORRECTION

PATENT NO. : 7,613,667 B2 Page 1 of 1
APPLICATION NO. : 11/173598
DATED : November 3, 2009
INVENTOR(S) : Coen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 333 days.

Signed and Sealed this

Nineteenth Day of October, 2010

David J. Kappos
*Director of the United States Patent and Trademark Office*